W. L. BLISS.
ADAPTER FOR AXLE DRIVEN GENERATORS.
APPLICATION FILED AUG. 21, 1911.

1,125,944.

Patented Jan. 26, 1915.

Witnesses:
Robert N. Weir
Geo. B. Jones

Inventor
William L. Bliss
By Edwin B. H. Towbridge
Atty.

UNITED STATES PATENT OFFICE.

WILLIAM L. BLISS, OF NIAGARA FALLS, NEW YORK, ASSIGNOR, BY MESNE ASSIGN-
MENTS, TO CENTRAL TRUST COMPANY OF NEW YORK, A CORPORATION OF NEW
YORK, TRUSTEE.

ADAPTER FOR AXLE-DRIVEN GENERATORS.

1,125,944.  Specification of Letters Patent.  Patented Jan. 26, 1915.

Application filed August 21, 1911. Serial No. 645,227.

*To all whom it may concern:*

Be it known that I, WILLIAM L. BLISS, a citizen of the United States, residing at Niagara Falls, in the county of Niagara and State of New York, have invented new and useful Improvements in Adapters for Axle-Driven Generators, of which the following is a full, clear, concise, and exact description, reference being had to the accompanying drawing, forming a part of this specification.

My invention relates to an adapter for a car-lighting generator.

The object of this invention is to provide suitable means which may be readily applied to one form of car lighting generator, to adapt the same to be installed on cars primarily designed to support other specific forms of generators.

Car-lighting systems are furnished with current from a car-lighting generator usually mounted on the car truck. Under the present practice these generators are supported by a frame of some sort projecting from the end of the car truck beneath the car body. The generator itself is usually supported either from above or below. When supported from below, it has either four points of support or two points of support. The four-point suspension is effected usually by supporting the generator on parallel cross-bars by means of projecting lugs or feet on the base of the generator, or on the base plate which supports the generator. The generator is thus supported in stable equilibrium. The two-point suspension is effected usually by mounting the generator on a single cross-rod by means of two projecting feet or lugs on the base of the generator. The generator is thereby supported in unstable equilibrium, but is maintained in substantially vertical position by the belt tension acting in one direction, and by a tension device acting in the other direction.

The projecting frames or supporting devices secured to the car truck are necessarily somewhat different as regards details in the case of two-point suspension from what they are in a four-point suspension. When it is desired, therefore, to mount a four-point suspension generator on a car truck having supporting brackets or devices designed for a two-point suspension generator, I provide an adapter which may be readily applied to the previously installed supporting device, and which coöperates readily with the type of generator which it is desired to use.

In the accompanying drawings I have illustrated one form of my adapter.

Figure 1:
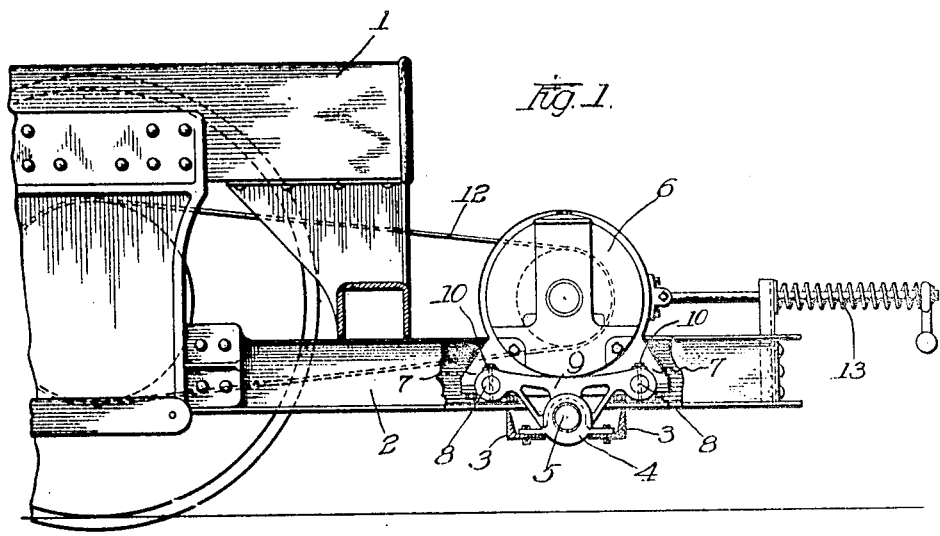
Figure 2:
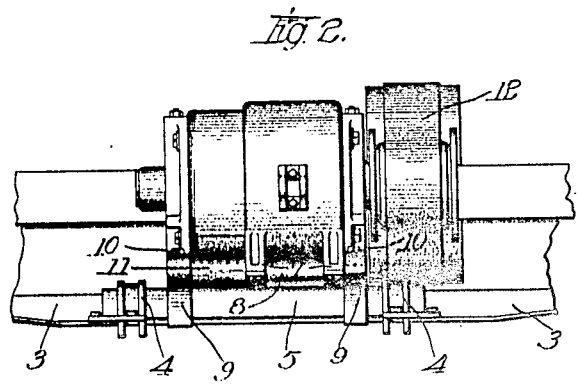

Figure 1 is a side elevation of a generator supporting device, of which the form of adapter referred to constitutes a part. Fig. 2 is an elevation of the generator and adapter as seen at right angles to the view shown in Fig. 1.

The car truck 1 is provided with a main supporting channel-shaped member 2 extending therefrom. This channel-shaped member is substantially U-shaped, but need not be described specifically, as it forms no part of the present invention. The cross-pieces 3 are supported by the channel-shaped member 2 in any suitable manner, and support the bearings 4, in which the shaft 5 is suitably mounted. This shaft 5 constitutes a pivotal support for the car-lighting generator 6, which generator, as shown, is intended primarily for a four-point suspension having two pairs of oppositely extending feet or lugs 7 adapted to be supported on the usual parallel cross-bars of a four-point suspension. These lugs, however, are supported in the present instance on two short rods 8, the ends of said rods being secured to the adapters 9. Each adapter comprises a substantially triangular-shaped member or rocker pivoted on the shaft 5, whereby the generator and adapters constitute substantially a unitary structure which is adapted to oscillate about the rod 5 as a pivotal support. The rod 8 has preferably reduced end portions which are received by the adapters 9, whereby a longitudinal play of said rods is prevented. Spacers in the form of tube members 11 may be provided surrounding the rod 8 between the feet or lugs 7 and adapters 9. Furthermore, the rods 8 are preferably secured to the adapters by the bolts 10.

The generator is driven by the belt 12 in the usual manner, the tension of the belt tending to swing the dynamo in one direction, which tendency is counteracted by the tension device 13 and associated parts, whereby the generator maintains a substantially upright position.

The advantages of the adapter are that a change may be readily made from one form of dynamo to the other without dismantling the main portions of the generator suspension, the adapter members are of simple configuration and readily manufactured, and therefore may be kept in stock without any great initial expense, in order that a change from one type of generator to the other may be effected at short notice whenever the necessity for such a change arises.

The invention is not limited to the details described, as other embodiments may be devised for accomplishing the same results.

What I claim as new and desire to secure by Letters Patent is:

1. An adapter for use in generator suspension, comprising a triangular-shaped rocker, the base portion of which is provided with a plurality of supporting points, and the apex of which is provided with a single supporting point.

2. An adapter for use in generator suspension, comprising a plurality of triangular-shaped members arranged in parallel planes, means for connecting the base portions together, forming a supporting frame, the apices being provided each with a single supporting point.

3. An adapter for use in generator suspension, comprising two triangular shaped rockers arranged in parallel planes, the base portions of which are provided with a plurality of supporting points and the apices of which are provided each with a single supporting point.

4. The combination with a car truck and a generator of means for supporting the generator from the truck, comprising a supporting member having a single point of attachment to one of said elements and a plurality of points of attachment to the other of said elements, said generator and supporting member being movable as a unit with respect to said car truck to provide for adjustment of said generator.

5. The combination with a car truck and a generator of means for supporting the generator from the truck, comprising a triangular-shaped supporting member, having a single point of attachment to one of said elements and a plurality of points of attachment to the other of said elements, said generator and supporting member being movable as a unit with respect to said car truck to provide for adjustment of said generator.

6. The combination with a car truck and a generator of a triangular shaped supporting frame detachably secured to said generator and said truck for supporting the generator from the truck, said frame being movable relative to said truck to provide for adjustment of said generator.

7. An adapter for supporting a generator from a car truck, comprising a supporting member provided with a single point of attachment to one of said elements, and a plurality of points of attachment to the other of said elements, the attachment between said member and truck providing for adjustment of said member to vary the position of a generator supported thereby.

8. As a new article of manufacture, an adapter comprising two similar triangular-shaped members, spacing rods therefor adapted to support a generator along two parallel axes, said members having alined openings to receive a supporting rod which constitutes a pivotal axis for said adapter and for the generator carried thereby.

9. In combination, a car truck, a generator supporting means projecting from one end of said truck, said means including a cross-rod, a generator provided with a supporting lug, and an adapter connected to said lug for supporting said generator, said adapter being mounted for limited rotation with respect to said cross-rod, whereby said generator may be adjusted relatively to the car truck.

10. In combination, a car lighting generator provided with supporting lugs on each side thereof, generator supporting means including a cross-bar supported from the car truck, and an adapter pivotally supported on said cross-bar and provided with a plurality of points of attachment corresponding to said supporting lugs, whereby said generator and adapter may be adjusted as a unit with respect to said car truck.

In witness whereof, I have hereunto subscribed my name in the presence of two witnesses.

WILLIAM L. BLISS.

Witnesses:
Wm. A. Furbayne,
F. J. Callahan.

Copies of this patent may be obtained for five cents each, by addressing the "Commissioner of Patents, Washington, D. C."